June 1, 1937.  E. C. RANEY  2,082,510
REFRIGERATOR CONTROL
Filed June 8, 1933  5 Sheets-Sheet 2
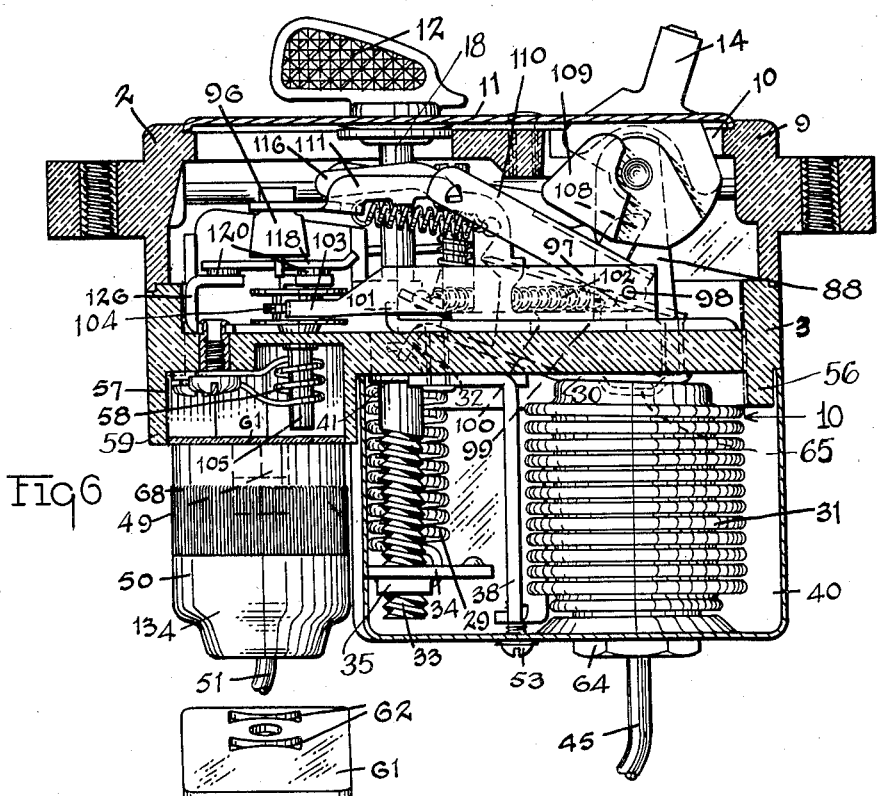
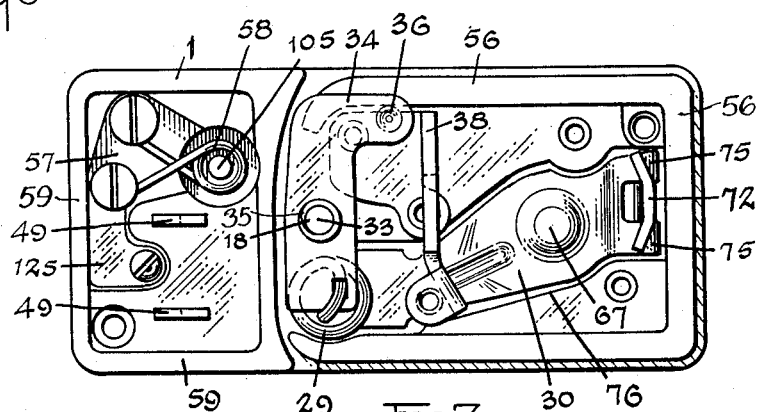
Inventor
Estel C. Raney
By Faust F. Crampton
Attorney Inventor
Estel C. Raney
By
Attorney Inventor
Estel C. Raney
By Faust F. Crampton
Attorney June 1, 1937.  E. C. RANEY  2,082,510
REFRIGERATOR CONTROL
Filed June 8, 1933   5 Sheets-Sheet 5
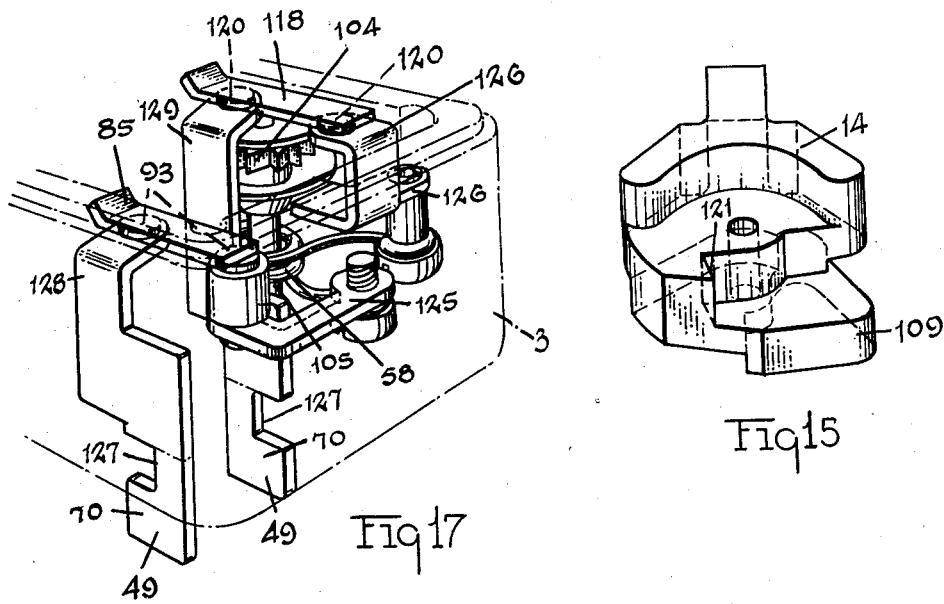
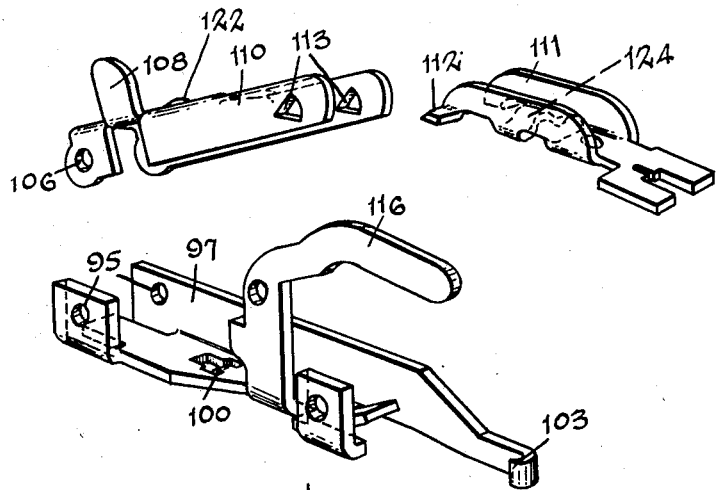
Inventor
Estel C. Raney
By Faust F. Crampton
Attorney Patented June 1, 1937

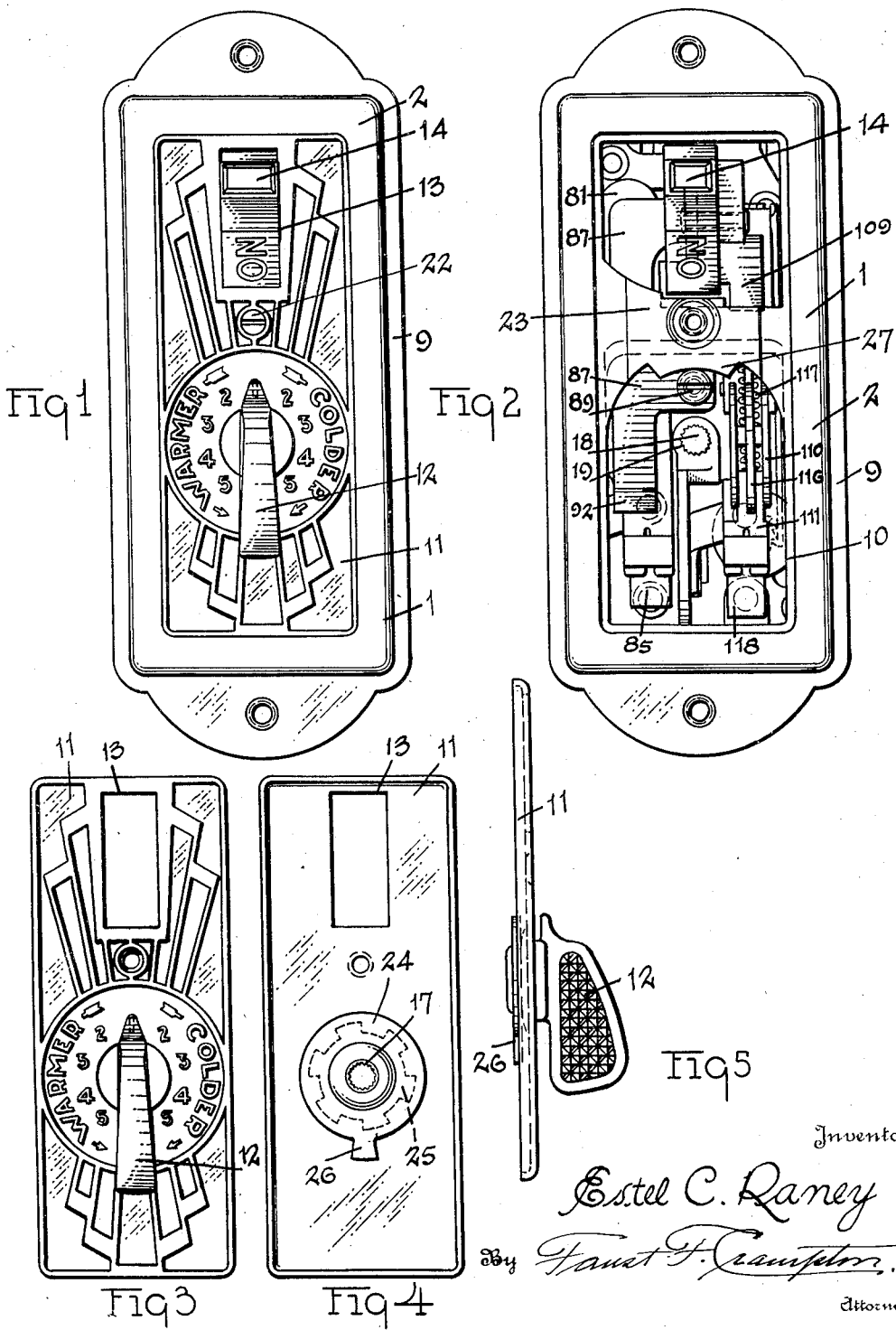

2,082,510

UNITED STATES PATENT OFFICE 2,082,510

REFRIGERATOR CONTROL

Estel C. Raney, Columbus, Ohio, assignor to Ranco Incorporated, Columbus, Ohio, a corporation of Ohio Application June 8, 1933, Serial No. 674,918

13 Claims. (Cl. 200—83)

My invention has for its object to provide an efficient adjustable refrigerator control switch mechanism for controlling the temperature of refrigerators.

The invention provides a structural arrangement whereby the parts of the control device may readily be made accessible for adjustment and for repair or replacements, and protective features to prevent injury to the motor that operates the refrigerator compressor by excess flow of current and also to prevent manual closing of the switch until the circuit has been restored to safe motor operating conditions.

The invention also provides a pair of switches assembled in mechanical parallel relation and connected in electrical series through conductors disposed in a confined space in one end of a shell and automatically controlled by elements at opposite ends of the shell.

The invention contains other features and advantages that will appear from the following description and upon examination of the drawings. Structures containing the invention may partake of different forms and may be varied in their details and still embody the invention. To illustrate a practical application of the invention, I have selected a refrigerator control device embodying the invention as an example of the various structures and details of such structures that contain the invention and shall describe the selected structure hereinafter, it being understood that variations may be made and that certain features of my invention may be used to advantage without a corresponding use of other features of the invention and without departing from the spirit of the invention. The particular structure selected is shown in the accompanying drawings.

Figure 9:
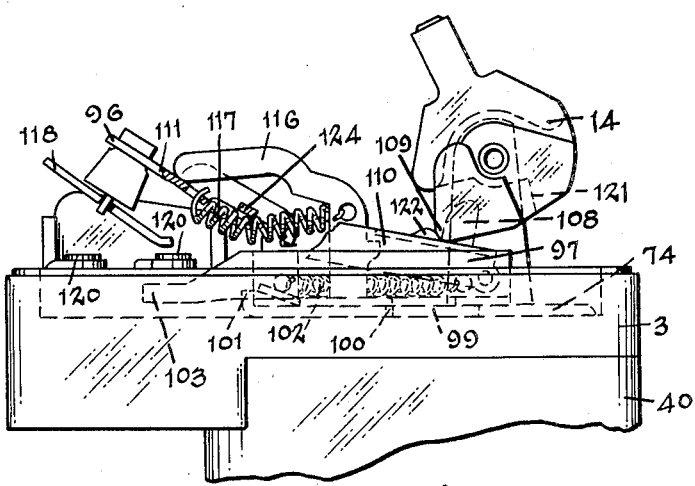
Figure 10:
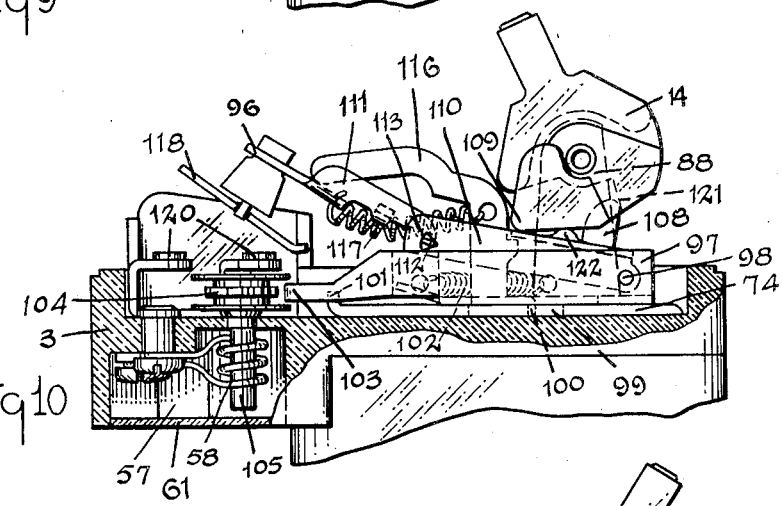
Figure 11:
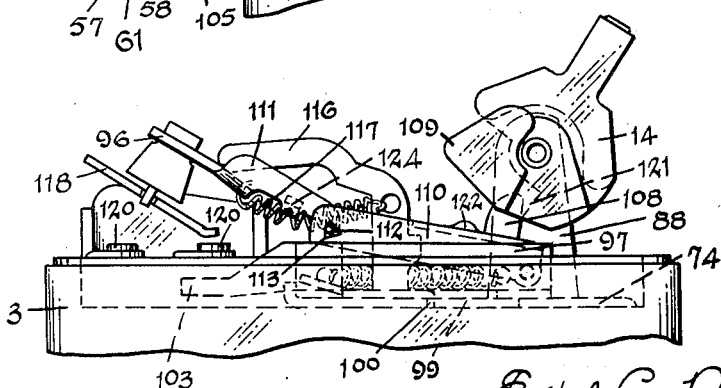
Figure 12:
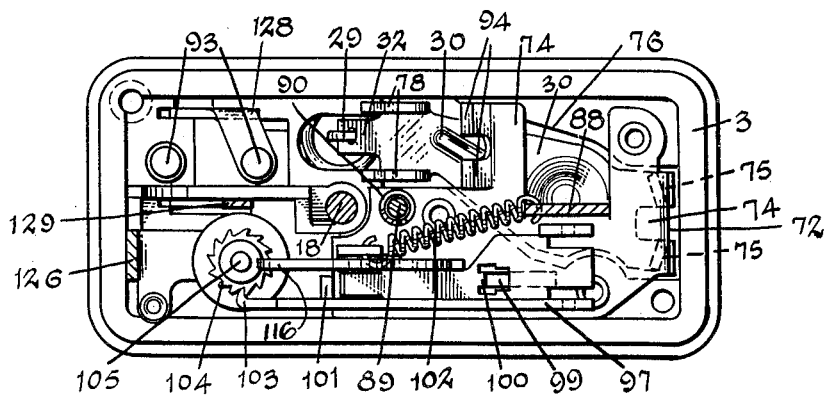
Figure 13:
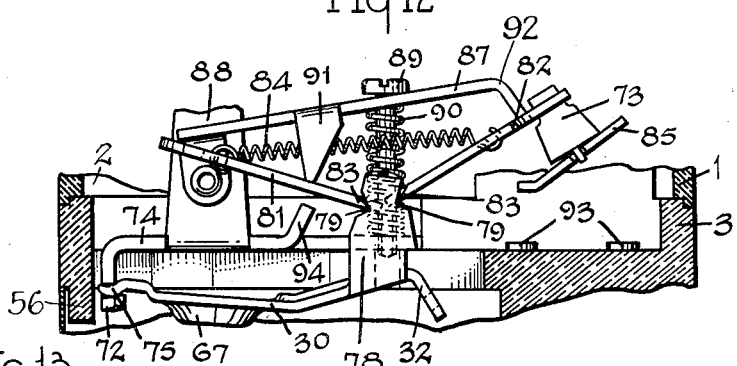
Figure 14:
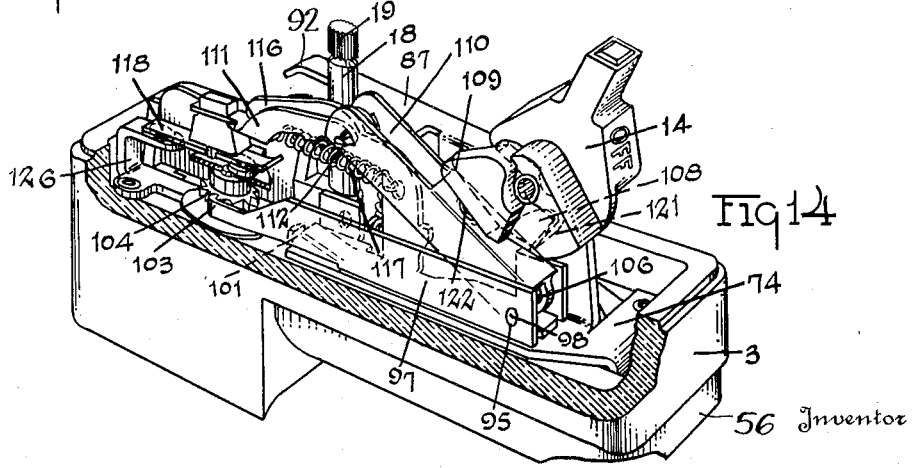

Fig. 1 is a front view of a refrigerator control device referred to. Fig. 2 illustrates a front view of parts of the control device, the face plate of the control device being shown removed. Fig. 3 illustrates a front view of the face plate. Fig. 4 illustrates a rear view of the face plate. Fig. 5 illustrates an edge view of the face plate. Fig. 6 illustrates a view of a longitudinal section of the control device. Fig. 7 illustrates an under side view of the control device, the electric and thermic connectors having been removed. Fig. 8 illustrates a cover plate for closing a chamber illustrated in Fig. 7. Fig. 9 illustrates a side view of one of the switches of the control device and one position of the switch control member, a part of the switch being shown in section. Fig. 10 illustrates a view of a section of the switch and control member shown in Fig. 9 when the movable contact is located remote from the fixed contacts. Fig. 11 illustrates a side view of the switch shown in Fig. 9 when the control member is in a third position. Fig. 12 illustrates a horizontal sectional view of the control device. Fig. 13 illustrates a side view of a second switch. Fig. 14 illustrates a perspective view of the switches of the control device. Fig. 15 illustrates a perspective view of the control member shown in Fig. 9. Fig. 16 illustrates a composite view of parts of the switch illustrated in Fig. 9. Fig. 17 is a perspective of parts of the control device that forms a part of the circuit controlled by the device.

The control device is contained in a segmental shell 1 formed of suitable hardened plastic electric insulating material. One of the parts, part 2, forms a supporting part adapted to be suitably mounted in a refrigerator while the other, part 3, constitutes a base that may be removably connected to the part 2 and on which the operative elements of the control device are mounted.

The shell part 2 is provided with a shoulder 9 that coacts to secure the control device in position. The shell part 2 is also provided with an inwardly extending flange 10 forming a shoulder for supporting the cover or face plate 11 of the control device. The cover or face plate 11 forms a means for removably and rotatively supporting a handle member 12 for varying the temperature limits at which the control device will close or open the circuit of the electric motor. The handle member 12 has a pointer that is moved relative to a suitable dial located on the face plate to indicate, relatively, the adjustments made by use of the handle. The face plate 11 is also provided with an opening 13 which is adapted to receive the rotative element 14 that is operable to manually control the circuit of the motor.

The hub of the handle or dial pointer 12 is provided with a fluted or serrated recess 17 and a rotative part, such as the screw 18, is rotatably supported in the base part of the shell and connected with a part of the control device that adjusts the thermic responsiveness of the control device. The end of the screw 18 is provided with a fluted end 19 that fits the fluted recess 17 of the hub of the pointer 12. The screw may be first adjusted to produce desired refrigerating conditions in the operation of the refrigerating apparatus, and the plate 11 may be placed in position, the fluted interfitting portions of the screw 18 and the handle 12 enabling registration at any relative setting of either the rod or the pointer or both. Preferably, the handle is limited in its adjustment and consequently is limited in its variation of the adjustment of the screw 18. Thus expert adjustment may be made by adjustment of the screw 18 and setting the pointer relative to the adjustment of the screw and limited variation of that adjustment may be made by the unskilled user by the use of the handle member 12.

If desired, the temperature range of the refrigerating apparatus may be lowered by moving the pointer 12 clock-wise to a desired point, such as to the limit of its clock-wise rotation, while the pointer is connected to the screw 18. The pointer 12 may then be disconnected from the screw 18 by removal of the plate 1. The pointer may then be turned relative to the plate, counter-clockwise an amount that it is desired to lower the normal refrigerating range, and the plate 1 may then be again connected to the shell, the pointer 12 being connected to the screw 18 in its new position and thus in a position displaced counter-clockwise relative to the screw the said amount. Thus the temperature range may be lowered as much as eight or ten degrees according to the relative change made in the dial pointer, while removed from the control device. The temperature range of the refrigerating apparatus may be raised in like manner, the dial pointer being first turned counter-clockwise while the pointer 12 is connected with the screw 18 and then clockwise when the pointer is disconnected from the screw. When the pointer is again connected to the screw, the range will be raised according to the extent that it was turned clockwise when the pointer and screw were disconnected.

The face plate 11 is secured in position by means of a screw 22 that extends through the plate and is threaded into a bridge 23 formed in the shell part 2 and so as to draw the turned edge of the face plate 11 against the flange or shoulder part 10 and seat it within the outer end of the shell part 2.

The handle 12 is rotatively secured by means of a disc 24 and a spring friction washer 25 that operates to yieldingly hold the pointer in the position to which it may be turned. The disc 24 is provided with a lug 26 and the bridge 23 is provided with a stop or lug 27 that may be engaged by the lug 26 to limit the rotative movements of the handle 12 and thus limit the range of adjustability that may be obtained through the operation of the handle 12.

The handle member 12 and the screw 18 adjusts a spring 29. The spring 29 operates through a lever 30, to resist the expansive movements of a bellows 31. The spring 29 is connected to a tongue 32 formed on the end of the lever 30 and to a plate 34 adjustably positioned by the rod 18. The lower end of the rod 18 is threaded as at 33, and the plate 34 has a threaded flange 35 and is located on the threaded portion 33 of the rod 18. Rotation of the plate 34 with the rod 18 is prevented by the nose 36, located on the end of the plate, engaging a partitioning plate 38 that is secured to the base part 3 of the shell 1. The partitioning plate 38 divides the interior of the shell 40 into two chambers, one of which contains the bellows and the other the lower end of the rod 18, the plate 34, and the spring 29. Longitudinal movement of the rod by the pull of the spring 29 is prevented by a suitable shoulder formed on the rod and a washer 41 that abuts the wall of the shell part 3.

The bellows 31 is connected by a suitable tube 45 with either the expansion chamber of the refrigerator wherein changes in pressure of the refrigerant occur in accordance with the heat absorbed, or the tube may be connected to a suitable bulb, that contains an expansive fluid whose pressure varies according to its temperature and which may be located in heat transmitting relation with that part of the refrigerator where desired temperatures are to be maintained by the operation of the refrigerator control. Change in temperature in the refrigerator thus produces change in pressure and consequently change in the volume of the bellows 31 is produced. The lever 30 being held against the bellows by the pressure of the spring 29, the change in volume of the bellows is dependent upon the adjustment of the spring.

The base part 3 of the shell is provided with a protruding flange 56 that extends along and is located a short distance from the outer edge of the base part 3. The shell 40 fits the flange 56 and is drawn against the shoulder extending along the edge of the base part 3 of the shell and outside of the flange by the screws 53. The bellows 31 is secured to the bottom of the metal shell 40 by a suitable clamp nut 64 and consequently the bellows may be readily mounted in the shell 40 and located in position to operate the lever 30.

When secured in position, the upper end of the bellows 31 engages the lever 30, the upper end of the bellows being preferably provided with a recessed portion 65 while the lever 30 is provided with a depressed portion 67 that substantially fits the recessed portion 65. The bellows and the lever interengage through the interfitting portions 65 and 67 to operate the switch.

The end portion of the base part 3 of the shell is chambered, as at 57, to receive a heat coil 58 for thermostatically controlling one of the switches of the control device. The terminals 49 of the control device protrude through the end portion of the base part of the shell. A flange 59 protrudes from the end portion of the shell part and a plate 61 of insulating material fits within the area of the flange. The plate 61 is provided with openings 62 that fit over the terminals 49. The plate covers the area within the flange 59 and closes the chamber of the heat coil 58.

A connector 50 is provided for connecting the device with a cable 51 that is connected to the motor of the refrigerating apparatus.

The switch 73, controlled by the temperatures of the refrigerator, is supported on the lever 30. The lever 30 is pivoted on a metal frame 74 that has a tongue 72 which extends into a large opening 76 formed in the base and in which the lever 30 is located. Preferably, the pivot end of the lever 30 is slotted to form a pair of tongues 75 that are located in slots extending inward from the sides of the depending tongue of the frame 74 to receive the tongues 75 of the lever. The upper edges of the slots may be knifed and the ends of the tongues 75 may be provided with V-shaped portions to provide a pivotal support for the lever 30. The portions of the depending tongue 72 of the frame 74 below the slots may be bent slightly to prevent outward longitudinal movement of the lever 30 except as the lever is tilted upward with respect to the base 3.

The end of the lever 30 is provided with a pair of uprights 78 that have V-shaped notches 79 located in opposite edges. A jointed switch arm is supported on the lever 30. The switch arm comprises a pair of slotted plates 81 and 82 having knife end edges 83 that engage in the notches 79. The contact 85 is thus oscillatably supported and operated by a spring 84 that is connected to the plates 81 and 82 at the ends of their slots so as to draw the plates into the notches 79. The angular movement of the plates is limited by suitable stops and consequently there is produced at all times a longitudinal pressure of the plates 81 and 82 into the recesses 79 and transverse pressure components that press the plates 81 and 82 against stops located above the plates 81 and 82, and a stop and the fixed contacts of the switch located below the plates. This is dependent upon the position in which the lever 30 locates the knife edges 83 of the plates 81 and 82 with respect to the spring 84. The plates 81 and 82 thus form a toggle joint and as the lever 30 is raised, so as to move the joint of the plates 81 and 82 past the spring, the plates 81 and 82 will be snapped upwards or downwards, the body of the spring moving through the slots of the plates and between the uprights 78.

A suitable adjustable stop 87 is pivotally supported on uprights 88 that extend from the frame 74. The stop 87 is adjustably secured in position by means of the screw 89 and a spring 90 is located on the screw and intermediate the stop and the frame 74. The spring operates to press the stop against the head of the screw. The screw is threaded into the frame 74. The adjustable stop 87 is provided with a pair of ears 91 that are adapted to engage the plate 81 and a tongue 92 that is adapted to engage the plate 82 and thus the stop limits the upward movements of the plates 81 and 82 by the operation of the spring 84. The opposite movements of the plates 81 and 82 are limited by parts located on the base 3. The plate 81 is limited by a pair of lugs 94 formed on the frame 74 that engages a central portion of the plate 81 while movement of the plate 82 is limited by the movable contact 85, that is carried by the plate 82, making contact with the fixed contacts 93 to close the switch.

The ears 91 of the stop 87 engage the plate 81 at a point relatively close to the joint of the plates 81 and 82, while the tongue 92 engages the plate 82 relatively remote from the joint, and consequently at a point well above the ends of the ears 91, with the result that as the lever 30 is raised, the ears 91 cause the major portion of the plate 81 to swing towards the base 3 in advance of the similar movement of the major portion of the plate 82. This enables an extremely wide opening movement of the movable contact compared to the movement of the lever 30. The spring 84 is lowered and moved towards the lever 30 as the lever 30 is raised by the operation of the bellows 31 and when the joint between the plates 81 and 82 passes the spring 84, the plates 81 and 82 snap towards the base 3, bodily moving about their joint to cause the contact 85 to close. When the lever 30 is lowered and the joint passes the spring 84, the movable contact 85 is snapped to a wide open position. The plate 82 being a relatively short plate, and the contact 85 being spaced from the plate by a suitable insulating block, the contact 85 slides on the contacts 93 upon each switch closing and opening movement and causes the movable contact to rub on the fixed contacts and maintain the contacts clean and remove any oxidized metal caused by the heat of current transmission through the contacts or by arcing at the break of the contacts.

The stop 87 is adjusted to cause the closing of the switch at the desired point of expansion of the bellows. The pressure of the gas within the bellows required to produce this particular expansion or volume, is controlled by the adjustment of the spring 29 and, consequently, the switch 73 may be closed and opened at the desired temperatures, dependent upon the adjustment of the rod 18.

The flow through the circuit of the motor is also controlled by an electrically operated thermic overload device, having means for automatically opening the circuit of the motor when for any reason an unusually large current flows through the motor that might do damage to the motor. Means is also provided for manually controlling the circuit of the motor.

The switch arm of the switch 96 is pivotally and slidably supported relative to the base 3 of the shell 1. The pivotal movement of the switch arm is subject to the control of the rotative element 14.

The switch arm of the switch 96 is pivotally supported on a slidable support or frame 97. The frame 97 is slidably supported on the frame 74 to produce longitudinal movement of the switch arm. The frame 97 is guided in its movement by means of a slot 99, formed in the frame 74, a tongue 100, that protrudes from the frame 97 and into the slot 99 formed in the frame 74, and a tongue 101 that engages a side part of the frame 97. A spring 102 is connected to the upright 88 and to the frame 97 to bias the frame laterally against the tongue 101 and to draw the frame endwise. The frame 97 has a hooked finger 103 that is adapted to engage a ratchet 104 supported on a pin 105 and, in the manner well known in such constructions, is normally connected thereto by a solder having preferably a predetermined melting temperature. When an overload current passes through the coil 58, it heats the pin 105 sufficiently to melt the solder and release the ratchet. When the temperature of the solder is allowed to become reduced, it again fixedly connects the ratchet wheel 104 relative to the pin 105. The frame 97 will thus be held in position when the finger 103 engages the ratchet wheel and the ratchet is secured to the pin. When the ratchet is secured the switch may be closed or opened by operation of the manual member 14.

The manual member 14 is rotatably supported on the upright 88 which forms a part of the frame 74. The member has a nose or cam portion 109 and when rotated in one direction or the other, the nose 109 engages or releases a part of the switch arm to open and close the switch. The switch has a jointed member formed of two connected parts, 110 and 111. The member 110 is oscillatable relative to the support or frame 97. It is pivotally supported by the pin 98 on the frame 97. The pin 98 is located in the openings 95 and 106. The member 111 is pivotally connected to the end of the member 110 by a pair of lugs 112 which are located in V-shaped openings 113. The frame 97 has an overhanging arm 116 and a spring 117 is connected to the part 111 of the switch arm and to the overhanging arm 116.

The spring 117 biases the part 110 to cause movement of the part 110 to close the switch. When the part 110 is pressed down by the member 14, the spring opens the switch. The end of the overhanging arm 116 forms a stop that limits the upward movement of the switch arm 111 produced by the spring 117. The movable contact 118 is connected to the end of the part 111 and coacts with the fixed contacts 120 to open and close the circuit.

When the joints of the parts 110 and 111 pass the spring, the part 111 is raised and the spring is engaged by the end of a slot formed in the part 111 or, preferably, by a cross member 124 that extends between sides of the member 111. The cross member 124 is located intermediate the joint of the switch arm and the point of connection of the spring 117 with the part 111 with the result that as the part 110 is depressed by the member 14, and the joint of the arm passes the spring, there is a snap opening movement of the switch and the spring is engaged by the cross piece 124, the portion of the spring between the cross piece 124 and its point of connection with the arm 116 is deflected to produce an increased inclination of the spring and an increased upward component and the cross piece 124 being located nearer the joint than the point of connection of the spring to the part 111, it reduces the amount of upward movement of the part 110 required to cause the joint to pass the spring to close the switch.

In order that the switch may be held open, notwithstanding the action of the spring 117 that tends to close it, the contacting portions of the part 110 and the member 14 may be shaped to yieldingly resist rotation of the member 14. In the particular form of construction shown the upper side of the part 110 is provided with a boss or bulged portion 122 having a convex surface that is engaged by the nose 109. When the member 14 is operated to depress the part 110, the nose 109 lodges on the side of the bulge 122 nearer the pivot pin 98, and the bulged portion operates to yieldingly hold the member 14 in position and against reverse movement and to hold the part 110 down and the switch open.

When the member 14 is moved to move the nose 109 past the bulged portion 122 and away from the pivot pin 98, the joint passes the spring and the switch closes.

When the frame 97, which pivotally supports the switch arm, is released from the ratchet wheel 104 and shifted by the operation of the spring 102, the member 14 is engaged by a part supported on the frame 97 and caused to rotate, to depress the part 110 and open the switch. In the particular form of construction shown, a tongue is formed on the part 110 near its pivot pin 98. The tongue 108 is engaged by a shoulder 121 formed in the member 14 at a point below its pivotal connection with the upright 88 and, consequently, when the frame 97 is shifted by the spring 102 the nose 109 will depress the part 110 to open the switch. To restore the switch to the control of the ratchet wheel, that is, to the control of the current, the member 14 is rotated in a direction that would normally close the switch, owing to the relative positions of the parts the switch is held open. By reason of the engagement of the shoulder 121 with the tongue 108, the part 110 is held down while the frame 97 is shifted longitudinally to a point where the finger 103 may engage the ratchet and if the overload conditions have returned to normal and the ratchet has been fixedly connected, the frame 97 will be held in this position, the switch, however, being held open until the member 14 is released. If, however, the ratchet has not become fixed in its connection, the frame 97 will not be engaged by the ratchet and the spring 102 will cause the return movement of the frame 97 as the member 14 is released and, as it is released, the member 14 will be rotated by the engagement of the tongue 108 with the member 14 to cause the nose to maintain the part 110 depressed and consequently, to maintain the switch open. Thus, the switch will be maintained open throughout the entire attempt of restoration of the switch to the control of the current. When, however, the ratchet wheel has been fixedly secured, with respect to the other parts of the control device and the frame 97 is shifted to enable engagement of the finger 103 with the ratchet wheel 104 by the operation of the member 14, releasement of the member 14 will permit the switch to close by the tension of the spring 117. Thus, the switch is restored to its normal operative condition and thereafter may be manually opened and closed until it is again automatically opened by the overload current.

In Fig. 17 is illustrated parts of the switch that are located in the circuit controlled by the switches of the control device. The terminals 49 extend through the end of the shell part 3 and are connected, one with one of the fixed contacts 93, by means of a projecting arm 128 on which the fixed contact 93 is located, and the other, with one of the fixed contacts 120, by means of the arm 129, on which the fixed contact 120 is located. The other contact 93 is connected to the heat coil 58 by means of the conductor bar 125. The other fixed contact 120 is connected to the heat coil by means of the conductor bar 126. The parts and the switches are thus located in series with the heat coil and are confined in one end of the shell part 3. The bars 128 and 129 extend through the bottom wall of the shell to locate the contacts on the upper side of the wall and the connectable terminals and heat coil in the chamber 57 located on the underside of the wall where they are substantially enclosed by the cover plate 61.

Describing briefly the operation of the control mechanism, the bellows 31 responds to the change of pressure communicated to it through the pipe 45. The pressure operates against the spring 29. The bellows and the spring cooperate to actuate the switch 73 to open and close the circuit in response to the temperature conditions of the refrigerator, as determined by adjustment of the screw 18. Variations of the adjustment of the screw 18 may be made by the handle 12 to modify, within limitations, the temperatures at which the switch will be opened and closed.

The switch mechanism is provided with means for manually opening and closing the circuit of the motor and for automatically opening the circuit when an excess current flows through the circuit of the motor. The contact 118 is supported on a switch arm formed of parts 110 and 111 and pivotally connected to the frame 97. The frame 97 is biased by a spring 102 for longitudinal movements and is normally retained in position against the tension of the spring 102 by means of the thermically controlled ratchet wheel 104 that may be released by an overload current flowing through the coil 58 that heats the pin 105 to melt solder that fixedly secures the ratchet wheel 104 against rotation when the current is normal. When the frame 97 is connected to the ratchet wheel, the switch may be opened and closed by the operation of the member 14. The member 14 is provided with a nose 109 that depresses the part 110 to move the joint between the parts 110 and 111 past the spring 117 which snaps open the switch. The spring operates to bias the part 110 in a direction to move the part 110 to close the switch. The switch, however, is held open by the nose 109 engaging the part 110. When an overload current flows in the motor circuit, the heat produced in the coil 58 releases the ratchet 104 and the spring 102 shifts the frame 97 and the switch arm. The shiftable parts are connected to the member 14 to rotate the member. In the particular form shown, a finger 108 is connected to the part 110 and rotates the member 14, which depresses the part 110 and opens the switch when the frame is shifted. Restoration of the switch to the control of the current of the motor circuit may be made by rotation of the member 14 when the ratchet wheel connection has become cooled to fixedly secure the ratchet. The frame is shifted by reverse rotation of the member 14. The member 14 engages the finger 108 and shifts the frame 97 to a point to enable the finger 103 to engage the ratchet 104 while it holds the switch open. Upon releasement of the member 14, the part 110 raises and enables the switch 118 to close. If the ratchet 104 has not become fixedly secured, the switch 118 will be retained open, while the spring 102 causes return movements of the frame 97 and the member 14.

I claim:

1. In a refrigerator electric control device, a shell, a pair of switches comprising a pair of movable contacts and located in the shell, a pair of terminals protruding from the shell, a pair of conductor bars, each terminal and conductor bar having a contact secured thereto, each movable contact having one of said bar contacts and one of said terminal contacts in circuit closing relation therewith, a thermic overload device for controlling one of the switches and connected to the said bars, and means for connecting the terminals with the external circuit.

2. In a refrigerator electric control device, a shell, a pair of switches comprising a pair of movable contacts and located in the shell, a pair of terminals protruding from the shell, a pair of conductor bars, each terminal and each conductor bar having a contact, each movable contact having one of said bar contacts and one of said terminal contacts in circuit closing relation therewith, a thermic overload device for controlling one of the switches and connected to the said bars, the shell having a chamber for containing the thermic overload device, a wall for separating the chamber from the said switches, and a plug having contacts for connecting the terminals with the external circuit.

3. In a refrigerator electric circuit control device, a contact, an oscillatable member, a switch member pivotally connected to the oscillatable member, means for pivotally supporting the oscillatable member, a spring for interconnecting the switch member and the supporting means, a means for moving the point of connection of the oscillatable member with the switch member past the center line of the spring, and means for engaging the spring at a point to move its effective point of connection with the switch member as the switch member moves to switch open position and operative to bias the oscillatable member to its switch closing position.

4. In a refrigerator electric circuit control device, a contact, an oscillatable member, a switch member pivotally connected to the oscillatable member, means for pivotally supporting the oscillatable member, a spring interconnecting the switch member and the supporting means, a means for moving the point of connection of the oscillatable member with the switch member past the center line of the spring, and means for engaging the spring intermediate its points of connection with the switch member and the supporting means and operative to maintain the switch member in a switch open position.

5. In a refrigerator electric circuit control device, a fixed contact, an oscillatable member, a switch member pivotally connected to the oscillatable member, means for pivotally supporting the oscillatable member, a spring interconnecting the switch member and the supporting means, a stop for limiting the movement of the switch member in a direction away from the contact, a manually operable member for moving the oscillatable member, and means for engaging the spring intermediate its points of connection with the switch member and the supporting means and operative to bias the switch member to its switch open position and the oscillatable member to its switch closing position.

6. In a refrigerator electric circuit control device, a fixed contact, an oscillatable member, a switch member pivotally connected to the oscillatable member, means for supporting the oscillatable member, a spring interconnecting the switch member and the supporting means, a stop for limiting the movement of the switch member in a direction away from the contact, a manually operable member for moving the oscillatable member relative to its supporting means, and means located on the switch member for engaging the spring intermediate its points of connection with the switch member and the supporting means and operative to bias the switch member to its open position and the oscillatable member towards its switch closing position.

7. In a refrigerator electric circuit control device, a supporting means, a movable frame supported on the supporting means, an oscillatable member pivotally supported on the frame, a switch member pivotally connected to the oscillatable member, a spring connected to the switch member and the frame, a manually operable member for moving the oscillatable member relative to the frame, a thermic means for engaging the frame, a second spring connected to the frame and biased to move the frame from the thermic means and for operating the manually operable means when disengaged by the thermic means.

8. In a refrigerator electric circuit control device, a movable frame, an oscillatable member pivotally supported on the frame, a switch member pivotally connected to the oscillatable member, means coacting with the oscillatable member to operate the switch member, a thermic means for engaging the frame, a spring connected to the frame and operative to move the frame away from the thermic means when disengaged by the thermic means, a manually operable means operative to engage the oscillatable member to open the switch when the frame is engaged by the thermic means and actuated by the spring to open the switch when the frame is disengaged from the thermic means.

9. In a refrigerator electric circuit control device, a movable frame, an oscillatable member pivotally supported on the frame, a switch member pivotally connected to the oscillatable member, a movable means coacting with the oscillatable member for operating the switch member, a thermic means for engaging the frame, a spring connected to the frame and biased to move the frame away from the thermic means, said movable means operative to open and close the switch when the frame is engaged by the thermic means, and to move the frame into engagement with the thermic means and maintain the switch open when the frame is disengaged therefrom.

10. In a refrigerator electric circuit control device, a supporting means, a frame slidably supported on the supporting means, an oscillatable member pivotally supported on the frame, a switch member pivotally connected to the oscillatable member, a spring connected to the switch member for biasing the switch member to open and closed positions according to the position of the oscillatable member, a manually operable member for operating the oscillatable member to open the switch, a thermic means for engaging the frame, a second spring connected to the frame and biased to move the frame away from the thermic means, the oscillatable member having an engageable part for engaging the manually operable means to move the manually operable means to open the switch upon the operation of the thermic means.

11. In a refrigerator electric circuit control device, a movable frame, an oscillatable member pivotally supported on the frame, a switch member pivotally connected to the oscillatable member, movable means coacting with the oscillatable member for operating the switch member, a thermic means for engaging the frame, a spring connected to the frame and biased to move the frame away from the thermic means, the oscillatable member having engageable parts, one part engaged by the said movable means for opening the switch when the frame is engaged by the thermic means, another of the parts engaged by the said means to interconnect the frame with the thermic means upon movement of the movable means in a direction to cause the switch to close and during said movement to maintain the switch open.

12. In a refrigerator electric circuit control device, a fixed contact, a supporting means, a frame slidably supported on the supporting means, an oscillatable member pivotally supported on the sliding frame, a switch member pivotally connected to the oscillatable member, a spring interconnecting the switch member and the frame, means for engaging the spring intermediate its point of connection with the oscillatable member and the frame to bias the oscillatable element to a switch closing position, a thermic means for engaging the frame, a second spring connected to the frame and biased to move the frame away from the thermic means, the oscillatable member having engageable parts, a manually operable means for operating the oscillatable member, one part engaged by the manually operable means when the frame is engaged by the thermic means and operative to open the switch, and another of the said parts engaged by the manually operable means to restore the engagement of the frame with the thermic means and to maintain the switch open during restoring movement of the frame.

13. In a refrigerator circuit control device, a supporting means, a frame slidably supported on the supporting means, an oscillatable member pivotally supported on the frame, a switch member pivotally connected to the oscillatable member, a fixed contact, a stop, the switch member movable between the contact and the stop to close and open the switch, a spring interconnecting the switch member and the frame, means for engaging the spring intermediate its points of connection with the switch member and the frame for biasing the switch member to the stop when the oscillatable member is in one position and to the contact when the oscillatable member is in another position, a second spring connected to the frame and to a fixed part of the supporting means, a manually operable member for moving the frame against the tension of the said second spring, a thermic means for engaging the frame to hold the frame against the tension of the said second spring and for releasing the frame when the flow of the current through the switch and the thermic means exceeds a predetermined amount, the manually operable means for closing the switch when the frame is in engagement with the thermic means when moved in one direction and for moving the frame to restore the frame to its engagement with the thermic means when disengaged therefrom while maintaining the switch in its open position and rotated in the said one direction.

ESTEL C. RANEY.